United States Patent [19]

Sevastakis

[11] Patent Number: 4,588,016
[45] Date of Patent: May 13, 1986

[54] CONTINUOUS CASTING APPARATUS

[76] Inventor: Gus Sevastakis, 5645 Angola Rd., Toledo, Ohio 43615

[21] Appl. No.: 638,214

[22] Filed: Aug. 6, 1984

[51] Int. Cl.<sup>4</sup> ............................................. B22D 11/08
[52] U.S. Cl. ................................... 164/425; 164/445; 164/483
[58] Field of Search ............... 164/425, 426, 445, 446, 164/483, 421

[56] References Cited

U.S. PATENT DOCUMENTS

| | | | |
|---|---|---|---|
| 3,702,631 | 11/1972 | Sergerie | 164/425 |
| 3,957,105 | 5/1976 | Foye | 164/425 |
| 4,285,388 | 8/1981 | Sevastakis | 164/444 |

Primary Examiner—Nicholas P. Godici
Assistant Examiner—R. K. Seidel
Attorney, Agent, or Firm—Barnes, Kisselle, Raisch, Choate, Whittemore & Hulbert

[57] ABSTRACT

A continuous casting apparatus comprising a tubular die, a cooler associated with the tubular die, and opposed pairs of drawing rolls associated with the outlet of the die for drawing the cast product from the die. One set of rolls is mounted for rotation about stationary axes and the other set of rolls is mounted for rotation about axes movable radially with respect to the cast product. A starting bar includes a starter tip dimensioned to fit within the die. The starter tip and starter bar are interconnected for adjustment radially relative to one another such that when the starting tip is inserted into the tubular die upon start up of the casting apparatus, the movable drawing rolls can be successively moved radially inwardly or outwardly with respect to the center line of the cast product to maintain the center line of the cast product aligned with the center line between the opposed sets of rolls.

11 Claims, 7 Drawing Figures

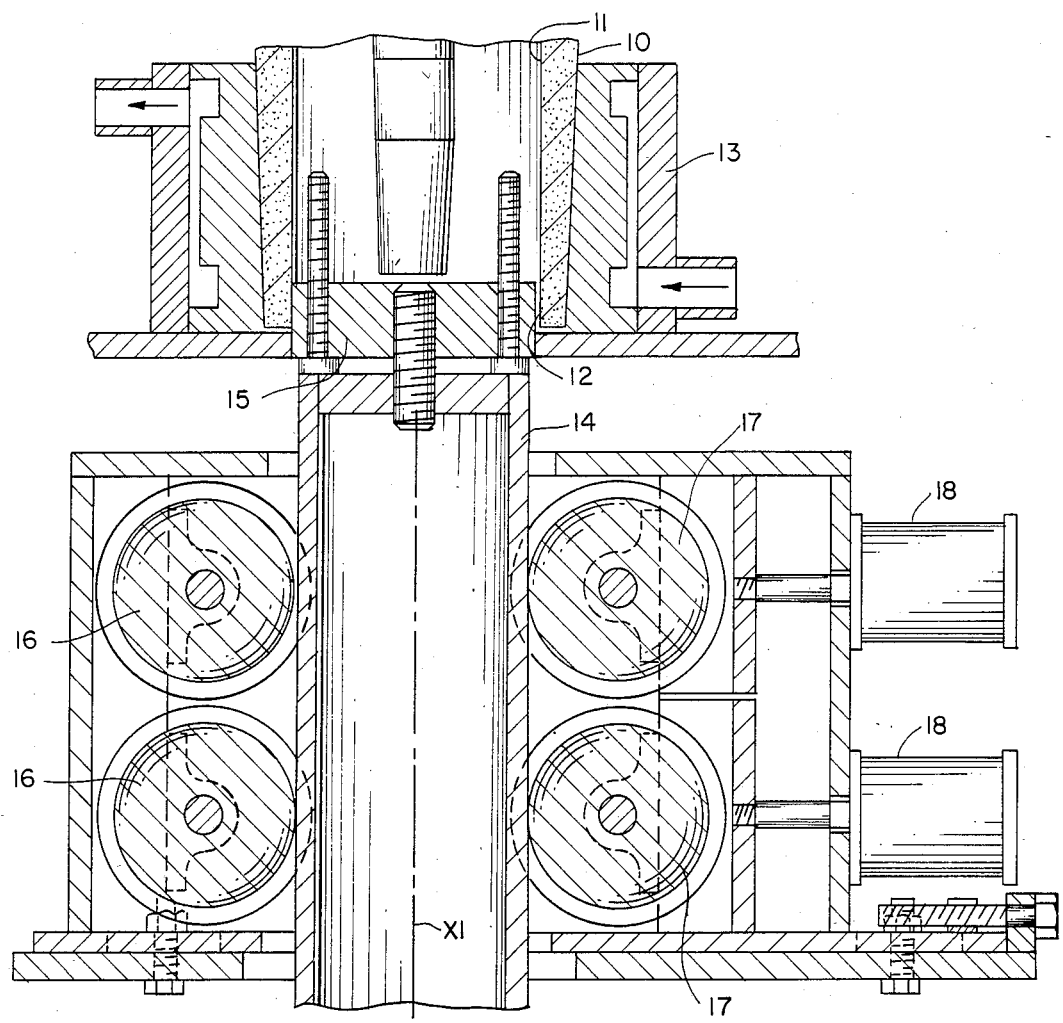
FIG. 1
PRIOR ART
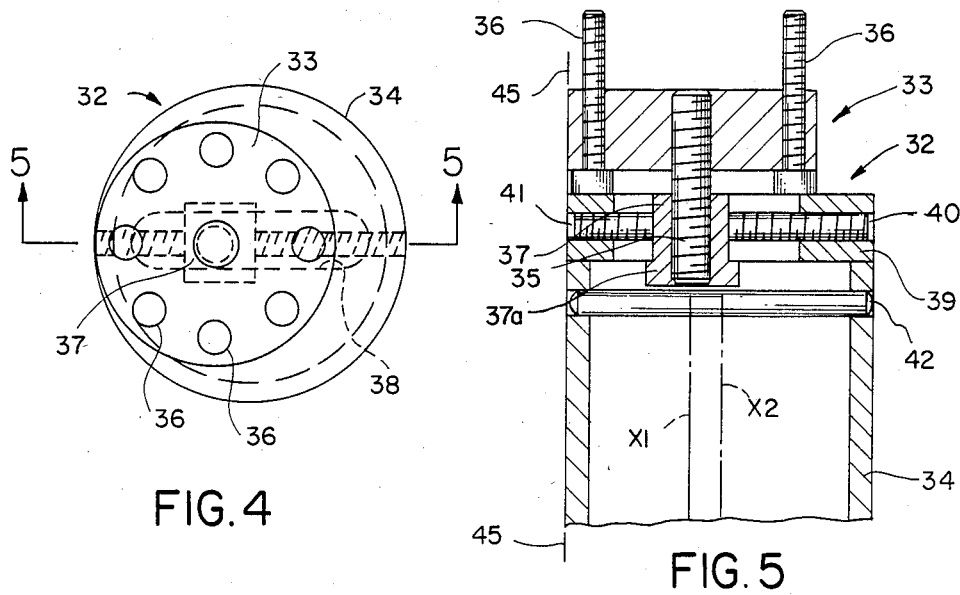
FIG. 4
FIG. 5

CONTINUOUS CASTING APPARATUS

This invention relates to continuous casting apparatus and particularly to starting bars utilized in the beginning of the operation of such apparatus.

BACKGROUND AND SUMMARY OF THE INVENTION

In continuous casting apparatus such as shown in U.S. Pat. Nos. 4,000,773, 4,178,982, 4,285,388, the casting apparatus conventionally utilizes a tubular die having an inlet through which the molten metal is introduced and an outlet through which the hot solidified cast product is removed, surrounded by a cooling assembly. In the start up of such apparatus, it is conventional to utilize a starting bar which supports a starter tip that draws the solidified metal axially between opposed sets of rolls, one set of which is mounted for rotation about a stationary axis and the other set of which has the rolls mounted for rotation about axes movable radially inwardly and outwardly.

In the operation, the starter tip is inserted in the tubular die and the starting bar is drawn axially by the rolls bringing the first portion of the cast product between the rolls.

The starter bar is made of a nominal size tube so that it is light in weight and economical to construct. The starter bar on vertical or horizontal machines varies in length from four feet up to 12 feet and in diameter from 1" up to 12". For economic reasons the starter bars are made of light tubing and have to be very straight and must be able to withstand the pressure of pinch rolls or the pulling jaws. The end of the starting bar is provided with a plug and a threaded bore to receive the starter tip. The starting bar and the starter tip have the same center line when they are assembled together. If the rolls are initially positioned to grip the starting bar, there will be a tendency to force the stationary rolls radially since the hot cast product expands upon leaving the die and has a diameter greater than the diameter of the starting bar. Since the one set of rolls is stationary, the cast product will be pulled downwardly but the center line of the product will tend to be shifted radially from the stationary rolls and the center line of the die. This causes a wave or sinuous configuration of the cast product and tends to apply lateral forces on the die. In addition, the tendency of the cast product or bar to move in a sinuous path tends to move portions of the product away from the die resulting in hot spots in the cast product which often causes a re-melting at these hot spots with a resultant interruption of the casting operation. In addition, the movement of the cast product tends to break the seal around the die with resultant leakage of hot metal at the top of the cooling assembly causing an interruption in the operation.

If the casting operation is not interrupted, the sinuous movement of the cast product produces a hot spot which will revolve about the periphery of the resultant cast product and produce a lack of homogeneity and a defective outer skin surface. More specifically, the hot spot tends to cause separation of the constituents of the molten metal and cracking on the outer surface.

In order to be able to start each nominal outside diameter of cast product, the same size of nominal starting bars are fabricated. Many times the starting bars are made from the same material as the cast products. This makes the bars heavy and cumbersome, difficult to straighten and not economical to stock.

Because of the aforementioned problems other standards have been adapted and an extra amount of stock added on the outside and inside diameter of the cast products.

Thus, for example, the additional material may be from 0.03 to 0.135 inch for outside diameters ranging between one inch and five inch. In the case of diameters over five inch, added material on the order of one-eighth to one-fourth of an inch is provided. In the case of the inside diameters on tubular products, additional material is provided on the order 0.060 inch for a one inch diameter up to one-fourth inch on larger diameters. This additional material not only requires machining which adds to the cost, but also results in increased scrap that increases the cost.

Where the products being cast have heavy walls or large diameters, the pulling forces must overcome substantial friction within the die. Failure to move the material which has been solidified on each stroke of the rotating rolls will result in stoppage of the casting operation or breaking of the die or breaking of the mandrel in the case of tubular products.

Accordingly, among the objectives of the present invention are to provide a starting bar assembly for continuous casting apparatus which functions vertically or horizontally and in casting upwardly or downwardly, which will result in maintaining the center line of the cast product aligned with the die; which obviates the need for individually sized starting bars and the resultant added cost and inventory; wherein the center line can be adjusted to accommodate differences in diameters; and which obviates the need and expense of straightening the cast products or otherwise substantially machining or reshaping the products; and which improves the efficiency of the casting operation.

In accordance with the invention, a starter tip being dimensioned to fit within the die is interconnected to a starting bar for adjustment radially relative to one another such that when the starter tip is inserted into the tubular die upon start up of the casting apparatus, the movable drawing rolls can be successively moved radially inwardly or outwardly with respect to the center line of the cast product to maintain the center line of the cast product aligned with the center line between the opposed sets of rolls.

DESCRIPTION OF THE DRAWINGS

FIG. 1 is a part sectional elevational view of a prior art casting apparatus.

FIG. 4 is a plan view of the starting bar and starter tip shown in FIG. 2.

FIG. 5 is a sectional view taken along the line 5—5 in FIG. 4.

DESCRIPTION

Figure 2:
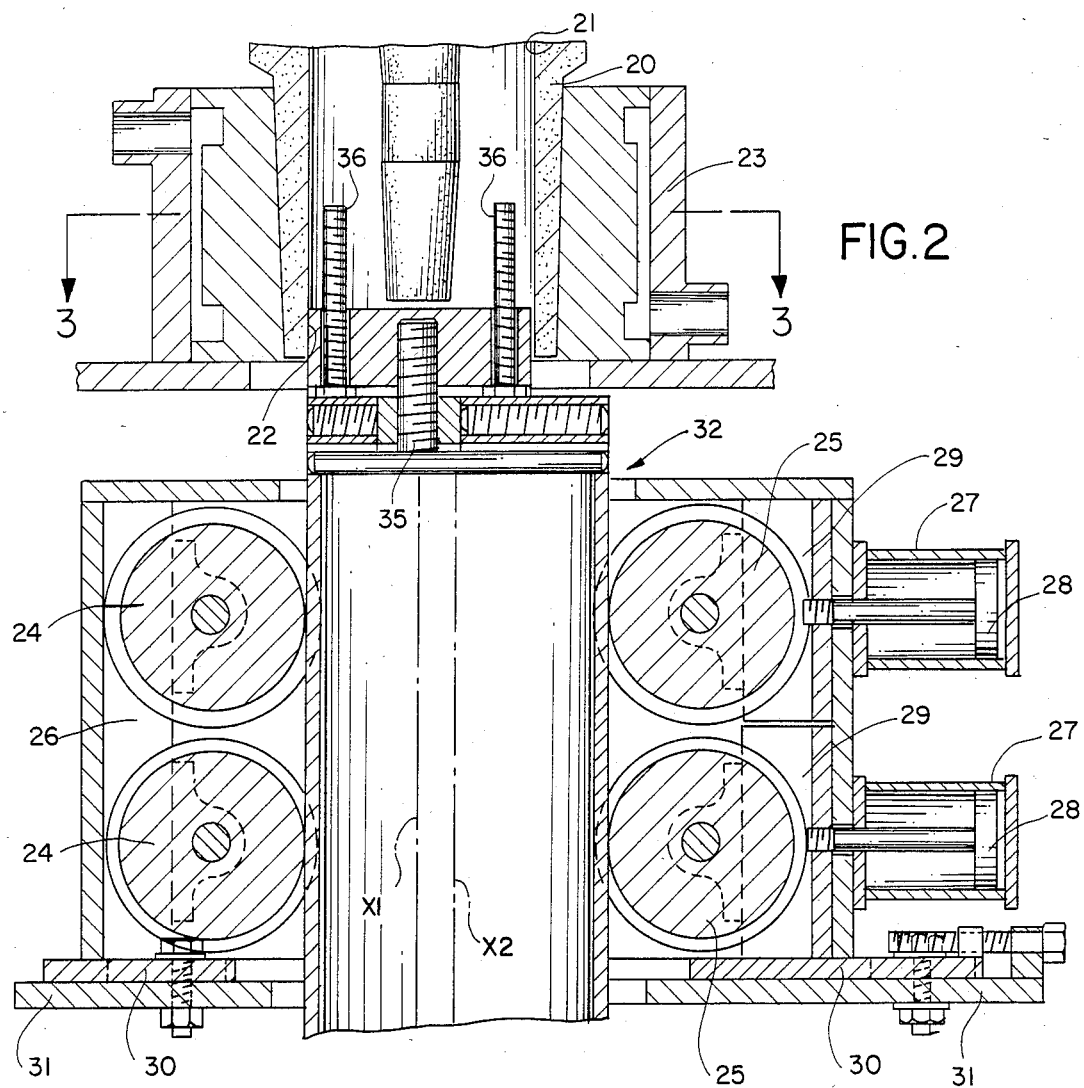
FIG. 2 is a part sectional elevational view of a casting apparatus embodying the invention.
Figure 3:
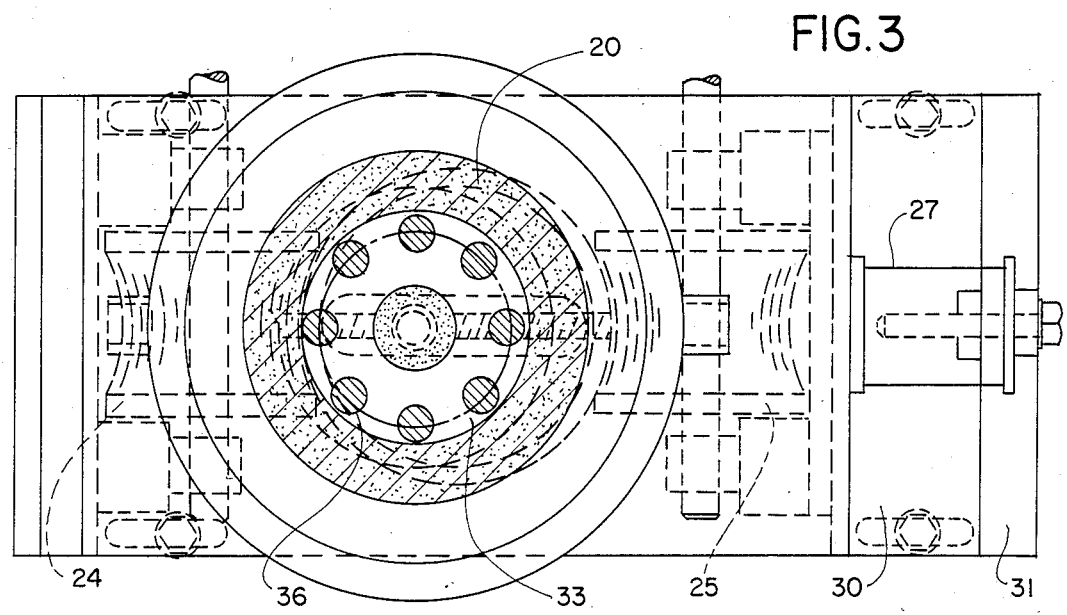
FIG. 3 is a sectional view taken along the line 3—3 in FIG. 2.

Referring to FIG. 1, a conventional casting apparatus comprises a tubular graphite die 10 having an inlet 11 and an outlet 12 surrounded by a cooling apparatus 13, as is well known in the aforementioned prior art, which is incorporated herein by reference. In such prior art apparatus, a starting bar 14 which supports a starter tip 15 is inserted in the die 10 and drawn axially by rolls 16, 17 bringing the first portion of the cast product between the rolls, the rolls 17 being movable by cylinders 10 controlled by suitable valves. The pinch rolls engage the starting bar and initially establish the center line of the casting products. The starter tip is positioned on the starting bar to form a tangential line with the starting bar. Initially the starter tip which is in close tolerance with the graphite die is inserted inside the cavity of the die to stop the molten metal, to form the product and to initiate the size of the casting bar. The starter tip which is fitted inside the die has a diameter slightly less than the die which is calculated to so provide enough clearance for the expansion of the starter tip when the metal enters the mold so that it is in close tolerance to maintain the centerline between the center lines of the die and the starting bar. The pinch rolls are initially positioned to hold the starting bar at the center line of the cast product. At the very top of the starting bar, the starter tip is centered with the starter bar, the graphite die and cooling device. The rolls are initially positioned to grip the starting bar 14, when the hot cast product has expanded and moves between the rolls 16, 17, the diameter of the product will be greater than the diameter of the starting bar 14. As a result, the aforementioned problems and difficulties will be encountered.

Referring to FIGS. 2-5, the casting apparatus embodying the invention comprises a tubular graphite die 20 having an inlet 21 and an outlet 22 surrounded by a cooling apparatus 23 as is well known in the art and shown, for example, in aforementioned U.S. patents, which are incorporated herein by reference.

Associated with the casting apparatus are draw rolls in two sets 24, 25, the set 24 being mounted for rotation on a stationary base 26 and the other set of rolls 25 being mounted for individual movement radially inwardly and outwardly by cylinders 27 having their pistons 28 connected to bases 29 on which the rolls 25 are mounted. The bases 26, 29 are mounted on an adjustable sub base 30 which, in turn, is mounted on a base 31.

In accordance with the invention, a starting bar assembly 32 is provided which includes removable and interchangeable starter tips 33 and a bar 34. Starter tip 33 has a threaded center hold for receiving a bolt 35 engaging the starter bar 34 and several drilled holes to receive threaded bolts 36 which engage the first portion of the product being cast at start-up. A block 37 is movable in a slot 38 in a plate 39 that closes the upper end of starting bar 34. Slot 38 extends diametrically of the threaded bar 32. Screws 40, 41 are threaded into the starting bar 34 and extend radially for engagement with the block 37 to lock the block 37 in radial adjusted position. The lower end 37a of block 37 is formed with an enlarged portion of greater cross section and extends beneath plate 39 to prevent axially outward movement of the block 37. A pin 42 extends diametrically beneath block 37 to prevent block 37 from moving axially into the starting bar 34.

In use, the starting bar assembly is adjusted so that it is tangent to the periphery of the stationary draw rolls 24 in order that as the product which is being drawn from the die moves between the rolls, there will be no tendency to move the stationary rolls radially. As the starting operation is begun, the movable rolls 25 engage the periphery of the starting bar 34. As the cast product is pulled downwardly by rotation of the rolls 24, 25 and the product moves into contact with the uppermost of the rolls 24, the uppermost movable roll 25 is moved radially toward the centerline of the cast products to the left as viewed in FIG. 2 into engagement with the periphery of the cast product therefore engaging the product and maintaining the center line of the product aligned with the center line X1 of the die. As the product is further pulled downwardly, it engages the lower stationary roll 24 and the movable roll 25 is moved radially from center line X2 toward the center line X1 of the cast product, to the left as viewed in FIG. 2 and into engagement with the periphery side of the product.

It can thus be seen that in this manner the center line of the cast product is maintained in alignment with the center line of the die. The peripheries of the starter bar 34, starter tip 33 and cast product adjacent the rolls 24 form a straight line tangential to rolls 24.

Figure 6:
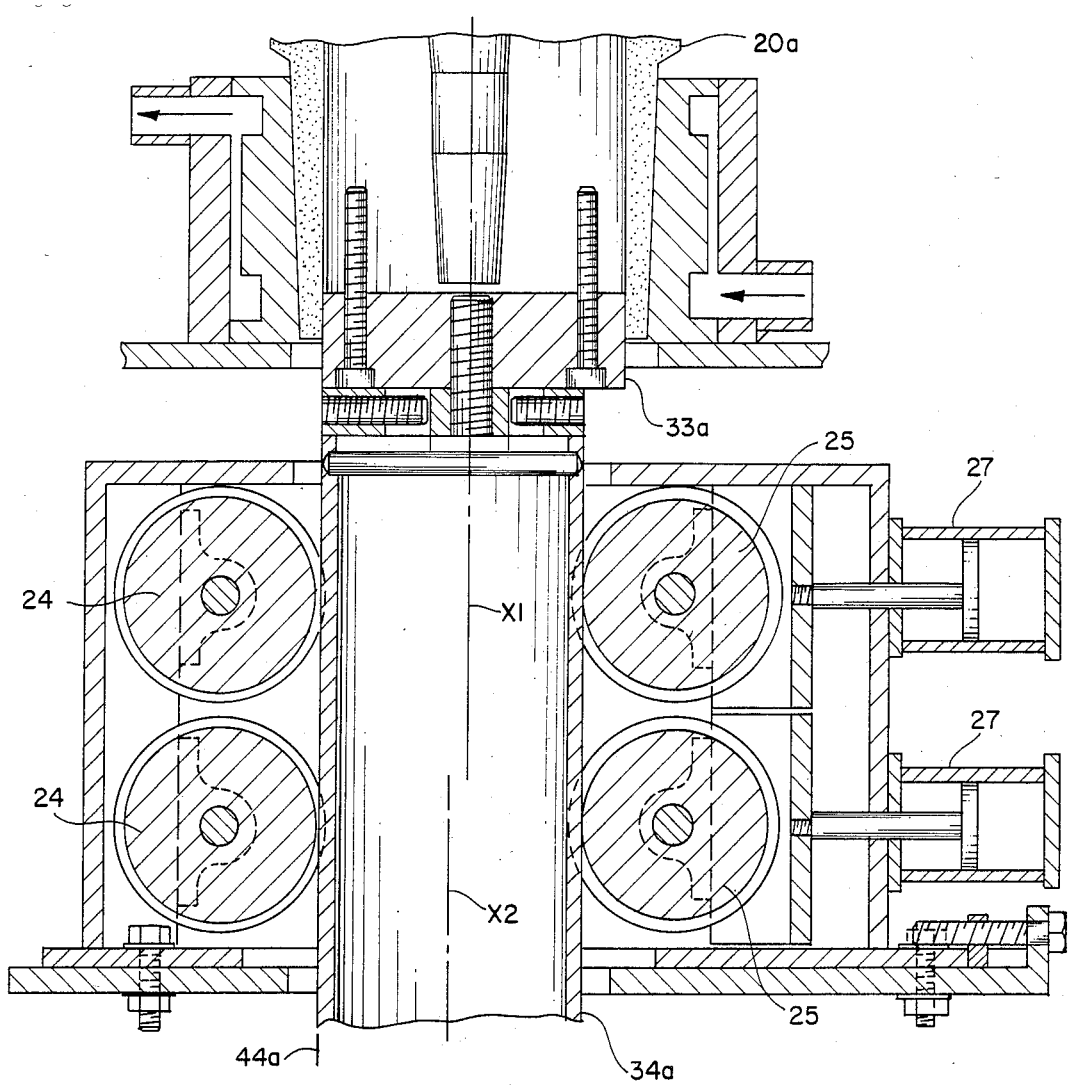
FIG. 6 is a view similar to FIG. 2 showing a modified casting apparatus.
Figure 7:
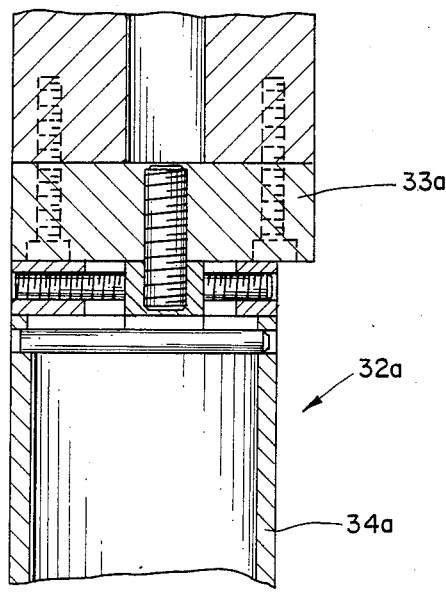
FIG. 7 is a sectional view of a portion of the starting bar, starter tip and cast product shown in FIG. 6.

The starting tips can be replaced in accordance with the diameter of the die. As shown in FIGS. 6 and 7, when a die 20a of larger diameter is used, a starting tip 33a is provided on the starter bar 34a once again with the periphery of the starter bar 34a and the starter tip 33a placed so that when the starter bar 32a is pulled downwardly by the rolls, the center line of the starter tip 33a will not be affected, and as the starting operation continues, in this case, the movable rolls 25 are moved radially away from the center line X2 to the right as viewed in FIG. 6 successively as the product moves downwardly in order that the center line X1 of the starter tip 33a and cast product will be maintained.

In the adjustment of the starter tip with respect to the starting bar, a small space is normally provided for expansion when the temperature rises at the starting operation so that the starter tip is slightly smaller in diameter than the lower end of the die 10. Accordingly, the starter tip 33a is positioned on the starter bar so that the periphery thereof is spaced radially inwardly with respect to the surface that engages the fixed rolls 24. The amount of movement of the starter tip toward the center line of the starting bar is calculated based upon the diameter of the starter tip and the temperature which is expected at the time that the cast product passes through the rolls so that the co-efficient of expansion will permit the calculation to be made. As a result, the starting bar, starting tip and cast product will form a straight line 44 tangential to the stationary pinch rolls 24, both at the start-up and during normal operation.

It can thus be seen that the starting bar arrangement of the present invention obviates the need for maintaining an inventory of all nominal cast product sizes. Further, in accordance with the invention, the starting arrangement precludes lateral forces on the stationary rolls or the die, the cast products will not have a sinuous configuration so that the necessity for straightening is eliminated and the necessity for annealing after straightening is eliminated, the cast products need not have added material which must be removed by machining with the resultant added cost of labor and scrap material and the sizes of the products being cast can vary substantially while still using the same size starting bar.

I claim:

1. For use in a continuous casting apparatus comprising a tubular die, a cooler associated with the tubular die, and opposed pairs of drawing rolls associated with the outlet of the die for drawing the cast product from the die, one set of rolls being mounted for rotation about stationary axes and the other set of rolls being mounted for rotation about axes movable radially with respect to the cast product, a starting bar assembly comprising
- a starter tip being dimensioned to fit within the die,
- a starting bar and
- means interconnecting the starter tip and starting bar for adjustment radially relative to one another such that when the starter tip is inserted into the tubular die upon start up of the casting apparatus, the movable drawing rolls can be successively moved radially inwardly or outwardly with respect to the center line of the cast product to maintain the center line to the cast product aligned with the center line between the opposed sets of rolls,
- said means interconnecting said starter tip and said starter bar comprising means on said starter bar defining a slot,
- a block fixed on said starter tip and adjustable along said slot,
- and means for holding said block and said starter tip in radial adjusted position relative to said starter bar.

2. The starter bar assembly set forth in claim 1 wherein said means for holding said block in adjusted position comprises opposed radially movable screws and threaded into said starter bar and engaging opposite surfaces of said block.

3. The starter bar assembly set forth in claim 2 wherein said means for holding said block in adjusted position includes an enlarged portion on said slot opposing the forces of the cast product and a pin placed horizontally and fixed diametrically on the starting bar to hold the block against axial inward movement but permit adjustment thereof within the slot.

4. For use in a continuous casting apparatus comprising a tubular die having an outlet opening, a cooler associated with the tubular die, and opposed pairs of drawing rolls associated with the outlet opening of the die for drawing the cast product from the die, one set of rolls being mounted for rotation about stationary axes and the other set of rolls being mounted for rotation about axes movable radially with respect to the cast product, a starting bar assembly comprising
- a starter tip being dimensioned to fit within the die,
- an elongated starting bar adapted to extend between and be engaged by said rolls and
- means interconnecting the starter tip and starting bar for adjustment radially relative to one another and for holding the starter tip and starting bar in the adjusted position sufficiently that when the starter tip is inserted into the outlet opening of the tubular die upon start up of the casting apparatus, the starting bar can be positioned so that the starting bar is tangent to the periphery of the fixed drawing rolls and the periphery of the opening and the center line of the starting bar is displaced radially with respect to the center line of the starter tip and such that the movable drawing rolls can be successively moved radially inwardly and outwardly with respect to the center line of the cast product such that the starting bar, starting tip and cast product can form a straight line tangential to the stationary rolls to maintain the center line of the cast product aligned with the center line of the die.

5. The starter bar assembly set forth in claim 4 wherein said means interconnecting said starter tip and said starter bar comprises means on said starter bar defining a slot,
- a block fixed on said starter tip and adjustable along said slot,
- and means for holding said block and said starter tip in radial adjusted position relative to said starter bar.

6. The starter bar assembly set forth in claim 5 wherein said means for holding said block in adjusted position comprises opposed radially movable screws and threaded into said starter bar and engaging opposite surfaces of said block.

7. The starter bar assembly set forth in claim 6 wherein said means for holding said block in adjusted position includes an enlarged portion on said slot opposing the forces of the cast product and a pin placed horizontally and fixed diametrically on the starting bar to hold the block against axial inward movement but permit adjustment thereof within the slot.

8. A continuous casting apparatus comprising
- a tubular die,
- a cooler associated with the tubular die,
- opposed pairs of drawing rolls associated with the outlet opening of the die for drawing the cast product from the die,
- one set of rolls being mounted for rotation about stationary axes,
- the other set of rolls being mounted for rotation about axes movable radially with respect to the cast product,
- a starting bar assembly comprising
- a starter tip dimensioned to fit within the die,
- an elongated starting bar adapted to extend between and be engaged by said sets of rolls and
- means interconnecting the starter tip and starting bar for adjustment radially relative to one another and for holding the starter tip and starting bar in the adjusted position sufficiently that when the starter tip is inserted into the outlet opening tubular die upon start up of the casting apparatus the starting bar can be positioned so that the starting bar is tangent to the periphery of the fixed drawing rolls and the periphery of the opening and the center line of the starting bar is displaced radially with respect to the center line of the starter tip and such that the movable drawing rolls can be successively moved radially inwardly or outwardly with respect to the center line of the cast product to maintain the center line of the cast product aligned with the center line of the die.

9. The continuous casting apparatus set forth in claim 8 wherein said means interconnecting said starter tip and said starter bar comprises means on said starter bar defining a slot,
- a block fixed on said starter tip and adjustable along said slot,
- and means for holding said block and said starter tip in radial adjusted position relative to said starter bar.

10. The continuous casting apparatus set forth in claim 9 wherein said means for holding said block in adjusted position comprises opposed radially movable screws and threaded into said starter bar and engaging opposite surfaces of said block.

11. The continuous casting apparatus set forth in claim 10 wherein said means for holding said block in adjusted position includes an enlarged portion on said slot opposing the forces of the cast product and a pin placed horizontally and fixed diametrically on the starting bar to hold the block against axial inward movement but permit adjustment thereof within the slot.

* * * * *